United States Patent
Thompson et al.

(10) Patent No.: US 11,439,950 B2
(45) Date of Patent: Sep. 13, 2022

(54) ELECTROCHEMICAL CELL, METHOD AND APPARATUS FOR CAPTURING CARBON DIOXIDE FROM FLUE GAS AND DECOMPOSING NITROSAMINE COMPOUNDS

(71) Applicant: University of Kentucky Research Foundation, Lexington, KY (US)

(72) Inventors: Jesse G. Thompson, Lexington, KY (US); James Landon, Lexington, KY (US); Xin Gao, Lexington, KY (US); Kunlei Liu, Lexington, KY (US)

(73) Assignee: Universiity of Kentucky Research Foundation, Lexington, KY (US)

( * ) Notice: Subject to any disclaimer, the term of this patent is extended or adjusted under 35 U.S.C. 154(b) by 454 days.

(21) Appl. No.: 16/458,611

(22) Filed: Jul. 1, 2019

(65) Prior Publication Data

US 2020/0001231 A1   Jan. 2, 2020

Related U.S. Application Data

(60) Provisional application No. 62/690,351, filed on Jul. 2, 2018.

(51) Int. Cl.
*C25B 9/19* (2021.01)
*B01D 53/32* (2006.01)
(Continued)

(52) U.S. Cl.
CPC ....... *B01D 53/326* (2013.01); *B01D 53/1425* (2013.01); *B01D 53/1475* (2013.01);
(Continued)

(58) Field of Classification Search
CPC ........... C25B 9/19; C25B 9/23; C25B 11/031; C25B 9/00; C25B 11/04; C25B 9/17;
(Continued)

(56) References Cited

U.S. PATENT DOCUMENTS 3,475,299 A    10/1969   Slager et al.
4,455,210 A *   6/1984   Coker ..................... C25B 13/00
                                                   204/283
(Continued)

FOREIGN PATENT DOCUMENTS

DE    102005040468 A    3/2007
EP      2559473 A1      2/2013
(Continued)

OTHER PUBLICATIONS

English machine translation of EP2559473 Abstract.
(Continued)

*Primary Examiner* — Zulmariam Mendez
(74) *Attorney, Agent, or Firm* — Stites & Harbison PLLC; Warren D. Schickli

(57) ABSTRACT

An apparatus for capturing $CO_2$ from flue gas includes (a) an absorber, (b) a stripper, (c) a heat exchanger, (d) an amine absorbent circulating through the absorber, the stripper and the heat exchanger, (e) a water washing unit downstream from the flue gas outlet of the absorber, and (f) an electrochemical cell. The electrochemical cell is connected to the water washing unit and is adapted to adsorb and decompose nitrosamine compounds present in liquid separated by the water washing unit.

7 Claims, 4 Drawing Sheets

(51) Int. Cl.
*B01D 53/14* (2006.01)
*B01D 53/18* (2006.01)
*C02F 1/461* (2006.01)
*C02F 1/467* (2006.01)
*B01D 3/14* (2006.01)

(52) U.S. Cl.
CPC .............. *B01D 53/18* (2013.01); *C02F 1/461* (2013.01); *C02F 1/4672* (2013.01); *C02F 1/46109* (2013.01); *B01D 3/14* (2013.01); *B01D 2252/204* (2013.01); *B01D 2256/22* (2013.01); *B01D 2258/0283* (2013.01); *C02F 2001/46133* (2013.01); *C02F 2001/46161* (2013.01); *C02F 2201/46115* (2013.01)

(58) Field of Classification Search
CPC ........... C25B 11/00; C25B 9/65; C25B 13/00; C25B 15/00; C25B 9/40; C02F 2201/46115; C02F 1/46109; C02F 2001/46157; C02F 1/4672; C02F 2001/46161; C25D 17/002; C25D 17/10
See application file for complete search history.

(56) References Cited

U.S. PATENT DOCUMENTS

| | | | |
|---|---|---|---|
| 4,808,284 A | 2/1989 | Bedell et al. | |
| 7,074,880 B2 | 7/2006 | Rhine et al. | |
| 7,081,142 B1 | 7/2006 | Carlson | |
| 8,503,162 B2 | 8/2013 | Seymour | |
| 8,641,887 B2 | 2/2014 | Majima et al. | |
| 8,828,533 B2* | 9/2014 | Dai ........................ | B01J 20/20 |
| | | | 428/317.9 |
| 9,132,380 B2 | 9/2015 | Menzel | |
| 9,133,407 B2 | 9/2015 | Koss et al. | |
| 9,543,569 B2 | 1/2017 | Worsley et al. | |
| 9,643,125 B2 | 5/2017 | Reddy et al. | |
| 2013/0053614 A1 | 2/2013 | Jackson et al. | |
| 2013/0313475 A1 | 11/2013 | Fischer et al. | |
| 2014/0151240 A1 | 6/2014 | Bedell et al. | |
| 2014/0163299 A1 | 6/2014 | Mitch | |
| 2014/0208753 A1* | 7/2014 | Liu ........................ | F01K 7/40 |
| | | | 60/652 |
| 2014/0263096 A1 | 9/2014 | Zahlsen et al. | |
| 2014/0345458 A1 | 11/2014 | Klinker | |
| 2016/0167984 A1* | 6/2016 | Gao ........................ | C02F 1/4691 |
| | | | 204/665 |
| 2017/0080411 A1 | 3/2017 | Fujita et al. | |
| 2017/0120185 A1 | 5/2017 | Hafner et al. | |
| 2017/0325495 A1 | 11/2017 | Bromberg et al. | |
| 2018/0065105 A1 | 3/2018 | Song et al. | |
| 2018/0079660 A1 | 3/2018 | Widger et al. | |

FOREIGN PATENT DOCUMENTS

| | | |
|---|---|---|
| GB | 1188064 A | 4/1970 |
| JP | 2003290770 A | 10/2003 |
| WO | WO2010075751 A1 | 7/2010 |
| WO | WO2014191160 A1 | 12/2014 |
| WO | WO2015161963 A1 | 10/2015 |
| WO | WO2017100867 A1 | 6/2017 |

OTHER PUBLICATIONS

English machine translation of JP2003290770 Abstract.
English machine translation of WO2010075751 Abstract.
English Machine translation of WO2014191160 Abstract.
English Machine translation of DE102005040468 Abstract.
English Machine translation of WO2015161963 Abstract.

* cited by examiner

ELECTROCHEMICAL CELL, METHOD AND APPARATUS FOR CAPTURING CARBON DIOXIDE FROM FLUE GAS AND DECOMPOSING NITROSAMINE COMPOUNDS

RELATED APPLICATION

This application claims priority to U.S. Provisional Patent Application 62/693,051 filed Jul. 2, 2018, which is hereby incorporated by reference in its entirety.

TECHNICAL FIELD

This document relates generally to an electrochemical cell of unique and novel structure as well as to an apparatus and method for capturing carbon dioxide from flue gas and decomposing nitrosamine compounds.

BACKGROUND

Widespread legislation requiring the capture of greenhouse gas emissions from major industries, including fossil fuel power generation, makes the implementation of commercial carbon capture systems (CCS) imminent. Among the various capture approaches, amine-based post-combustion CCS is currently the most promising option for separating carbon dioxide from industry flue gases due to its relatively simple operation, high absorption capacity and technological maturity.

There are, however, still costs and environmental concerns that are slowing widespread implementation of this technology. The possibility of forming highly carcinogenic nitrosamines within the CCS process and their subsequent possible emission into the environment, is arguably one of the critical concerns for regulators and communities near proposed CCS property.

Nitrosamines are organic degradation products known to form from amines, particularly secondary amines or secondary amine-containing degradation products, and $NO_x$ oxidants that are common flue gas components. Nitrosamines have been detected from amine water wash sections up to 59 µM (Dai et al, Environ. Scy. Technol. 2012, 46, 9793-9801) and in emissions up to 47 ng/$Nm^3$ (Dai Silva et al, Energy Procedia, 2013, 37, 778-783). Despite unfavorable conditions from nitrosamine formation, the detection of even low levels of nitrosamines can lead to the delay of a CCS project. Nitrosamines currently represent one of the last technical challenges amine-based CCS is facing.

Current water wash technologies are located after the absorber column, and are designed to provide solvent entrainment from vapors and aerosols that contain amine solvent and degradation products from being released into the atmosphere. Some potentially dangerous compounds, such as nitrosamines, escape the bulk solvent and are very likely to be caught in the water wash section due to its high solubility. It is far more advantageous to adsorb the nitrosamine contaminants in the water wash, where the parent amine concentration is only ~0.3 wt % than to treat the bulk solvent with a concentration of 30-45 wt %. The novel technology consists of a selective electrochemical cell added to the recirculating water wash stream, to selectively remove and decompose nitrosamines while leaving other solution components intact. The water wash solution that captures water vapor and organic compounds from the absorber and recirculates within the water wash section, includes a pathway for overflowing the wash water into the absorber column for water and solvent balance. Isolation and decomposition of nitrosamine contaminants in the water wash section will maintain significantly lower nitrosamine concentrations in the water wash stream that minimizes its emission to the atmosphere and eliminates the need for a separate reactor to reduce nitrosamines with $H_2$, treat the entire bulk solvent, or dispose of the solvent or water wash as hazardous waste due to nitrosamine contamination.

This document relates to a new electrochemical cell adapted for decomposing nitrosamines and other compounds as well as to a new apparatus and new method for capturing carbon dioxide from flue gas and decomposing nitrosamines in an efficient and commercially viable manner.

SUMMARY

In accordance with the benefits and advantages described herein, a new and improved electrochemical cell is provided. That electrochemical cell comprises: (a) an anode, including a first carbon xerogel electrode and a first current collector, (b) a cathode, including a second carbon xerogel electrode and a second current collector, (c) a separator made from an insulating material, (d) a current source applying an electrical current to said anode and said cathode, and (e) both anode and cathode selectively absorbing nitrosamines over bulk chemicals.

The first current collector and the second current collector may be made from titanium or other appropriate material. Further, the first end plate may include a solution inlet while the second end plate may include a solution outlet.

In one possible embodiment, the anode is provided adjacent the first end plate and the cathode is provided adjacent the second end plate. Further, the separator is porous.

In another possible embodiment, the cathode is provided adjacent the first end plate and the anode is provided adjacent the second end plate. Further, the separator is porous.

In still another possible embodiment of the electrochemical cell, the first end plate has a first solution inlet and a first solution outlet, and the second end plate has a second solution inlet and a second solution outlet. In such an embodiment the first end plate is adjacent the anode, the second end plate is adjacent the cathode and the separator is nonporous.

In accordance with an additional aspect, a new and improved apparatus is provided for capturing carbon dioxide ($CO_2$) from flue gas. That apparatus comprises: (a) an absorber, including a flue gas inlet, a flue gas outlet, a $CO_2$-lean amine absorbent inlet and a $CO_2$-rich amine absorbent outlet, (b) a stripper, including a $CO_2$-rich amine absorbent inlet, a $CO_2$-lean amine absorbent outlet and a capture $CO_2$ outlet, (c) a heat exchanger adapted to receive $CO_2$-lean amine absorbent from the stripper being delivered to the $CO_2$-lean amine absorbent inlet and $CO_2$-rich amine absorbent from the absorber being delivered to the $CO_2$-rich amine absorbent inlet, (d) an amine absorbent circulating through the absorber, the stripper and the heat exchanger, (e) a water washing unit downstream from the flue gas outlet and (f) an electrochemical cell connected to the water washing unit and adapted to remove and decompose nitrosamine compounds present in liquid separated by said water washing unit.

The electrochemical cell of the apparatus may further include an anode, a cathode, a separator and a current source. The anode includes a first carbon xerogel electrode and a first current collector. The cathode includes a second carbon xerogel electrode and a second current collector. The separator is made from an insulating material. Further, the current source applies an electric current to the anode and the cathode. The first current collector and the second current collector may be made from titanium or other appropriate material. The apparatus may also include a first end plate, including a solution inlet, and a second end plate, including a solution outlet. In one possible embodiment, the anode is provided adjacent the first end plate, the cathode is provided adjacent the second end plate and the separator is porous. In another possible embodiment, the cathode is provided adjacent the first end plate, the anode is provided adjacent the second end plate and the separator is porous.

In still another possible embodiment of the apparatus, the apparatus includes a first end plate having a first solution inlet and a first solution outlet and a second end plate having a second solution inlet and a second solution outlet. In such an embodiment the first end plate may be provided adjacent the anode while the second end plate may be provided adjacent the cathode and the separator is nonporous.

In accordance with still another aspect, a new and improved method is provided. That method comprises the steps of: (a) removing $CO_2$ from a flue gas by contacting the flue gas with an amine absorbent in an absorber, (b) separating organics and water vapor from the flue gas discharged from the absorber, (c) passing at least a portion of the separated liquid through an electrochemical cell and (d) removing and decomposing nitrosamines in the liquid by applying an electric current across an anode and a cathode of the electrochemical cell.

The method may further include the step of returning the liquid to the absorber following decomposing of the nitrosamines. In addition, the method may include applying an electric current between 5.0 and 100.0 $mA/cm^2$ across the anode and the cathode. Further, the method may include continuously applying the electrical current of between 5.0 and 100.0 $mA/cm^2$.

Still further, the method may include the step of delivering $CO_2$-rich amine absorbent from the absorber to a stripper. Further, the method may include stripping $CO_2$ from the amine absorbent in the stripper. Still further, the method may include returning $CO_2$-lean amine absorbent from the stripper to the absorber for absorbing $CO_2$ from the flue gas.

In the following description, there are shown and described several preferred embodiments of the electrochemical cell, the apparatus for capturing $CO_2$ from flue gas and the related method. As it should be realized, the electrochemical cell, the apparatus and the method are capable of other, different embodiments and their several details are capable of modification in various, obvious aspects all without departing from electrochemical cell, apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the electrochemical cell, the apparatus and the method and together with the description serve to explain certain principles thereof.

Reference will now be made in detail to the present preferred embodiments of the electrochemical cell, the apparatus and the method, examples of which are illustrated in the accompanying drawing figures.

DETAILED DESCRIPTION

Figure 1:
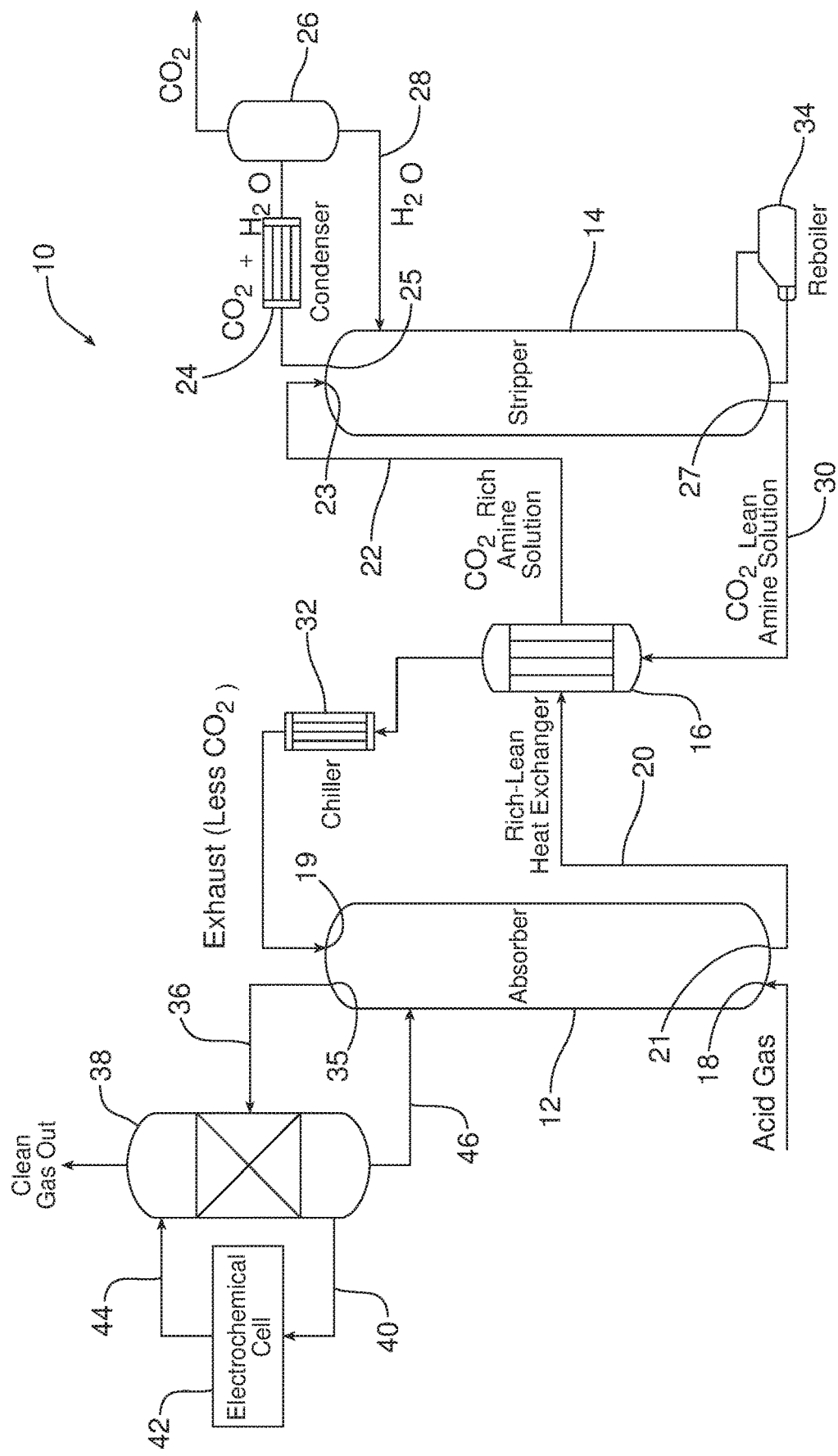
FIG. 1 is a schematic illustration of the apparatus for capturing $CO_2$ from flue gas incorporating an electrochemical cell for nitrosamine decomposition.

An apparatus 10 adapted for thermal swing processing and capturing $CO_2$ from flue gas is illustrated in FIG. 1. An aqueous amine absorbent is circulated between an absorber/absorption tower 12, a stripper 14, and a heat exchanger 16. The flue gas or acid gas, containing $CO_2$, enters the bottom of the absorber 12 at the flue gas inlet 18. The amine absorbent enters the top of the absorber/absorber tower 12 at the $CO_2$-lean absorbent inlet 19 in counter-current flow to the acid gas. As the acid gas and the amine absorbent come into contact in the absorber 12, amine absorbent removes the $CO_2$ from the gas stream. The amine absorbent, now rich in $CO_2$, is discharged from the bottom of the absorber/absorber tower 12 at the $CO_2$-rich amine absorbent outlet 21 and passed, (note action arrow 20) through the heat exchanger 16 to improve efficiency before entering the top of the stripper 14 (note action arrow 22) at the $CO_2$-rich amine absorbent inlet 23 where the amine absorbent is heated to a higher temperature. The stripper 14 removes the $CO_2$ as a gas from the amine absorbent. The $CO_2$ is passed through captured $CO_2$ outlet 25 to the condenser 24 and separated from water at the separator 26. The $CO_2$ is then subjected to downstream processing or storage while the water is returned to the stripper (note action arrow 28). The $CO_2$ lean-amine solution exits the bottom of the stripper 14 through the $CO_2$-lean amine absorbent outlet 27 (note action arrow 30) and is returned to the absorber 10 by way of the heat exchanger 16 and the chiller 32. The reboiler 34 functions to prevent amine absorbent from settling to the bottom of the stripper.

As should be appreciated, following removal of $CO_2$ in the absorber, the acid gas or flue gas is discharged from the absorber 12 through the flue gas outlet 35 and delivered (note action arrow 36) to the water washing unit 38. Water washing unit 38 is a packed column adapted to recover water vapor, amine entrainment, aerosol and amine vapor and separate the flue gas from the liquid. As illustrated by action arrow 40, a portion or slipstream of the separated liquid is delivered to the electrochemical cell 42 where nitrosamines are absorbed and decomposed by oxidation and reduction before that liquid is returned from the electrochemical cell to the water washing unit 38 at action arrow 44. Treated liquid including recovered amine absorbent is returned from the water washing unit 38 to the absorber 12 at action arrow 46.

Figure 2:
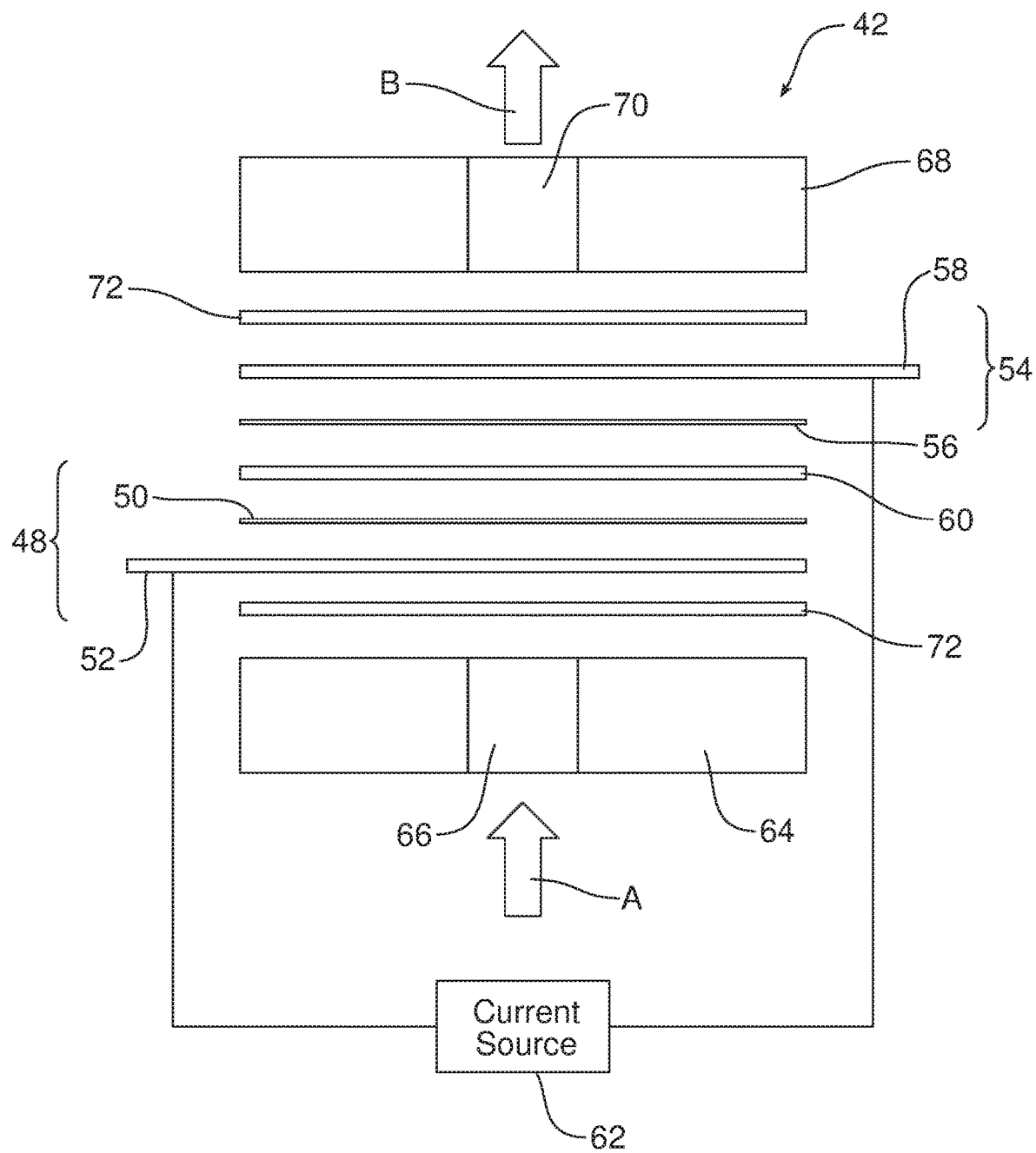
FIG. 2 is a schematic illustration of one possible embodiment of that electrochemical cell illustrated in FIG. 1.
Figure 3:
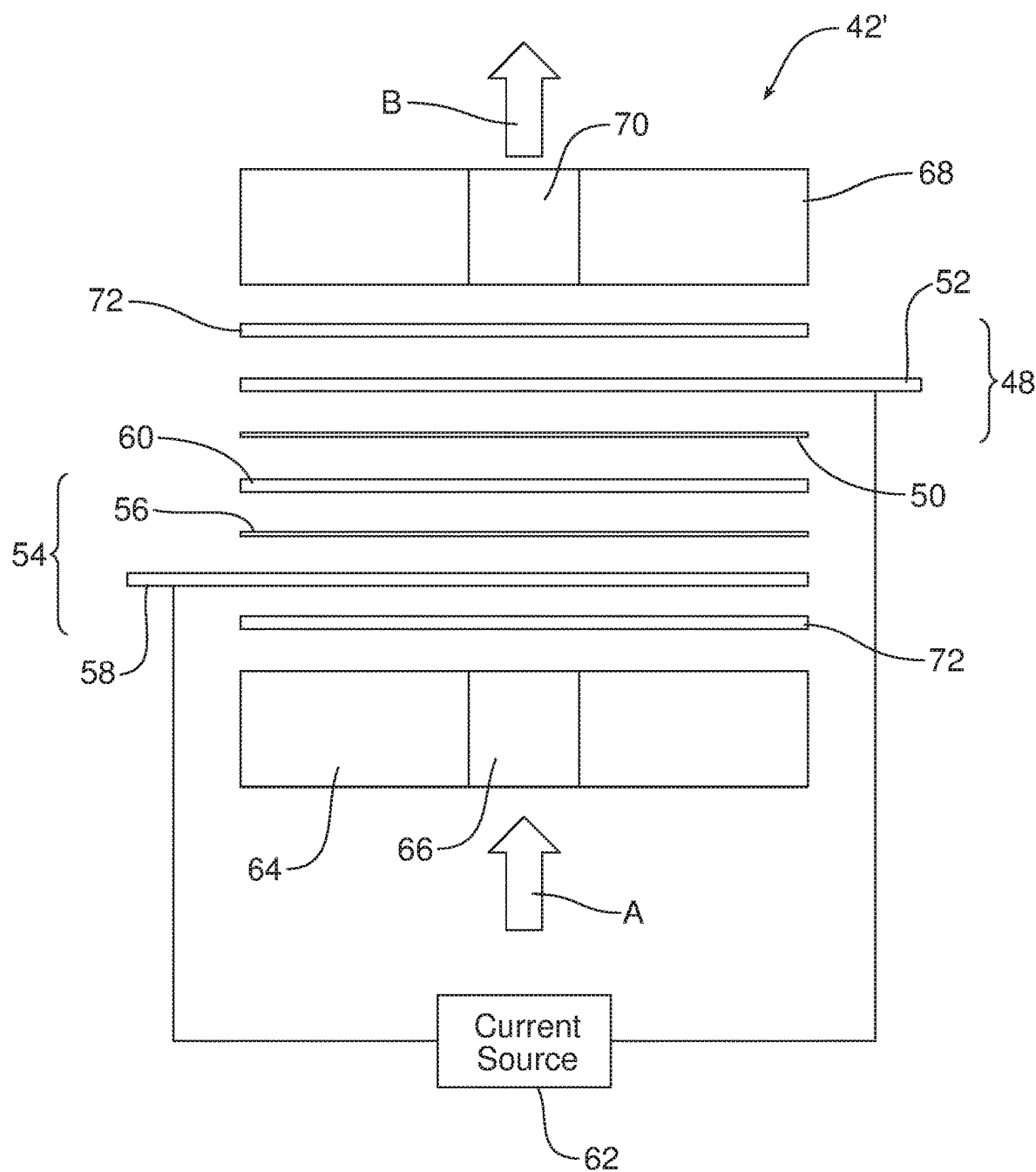
FIG. 3 is a schematic illustration of a second possible embodiment of the electrochemical cell illustrated in FIG. 1.
Figure 4:
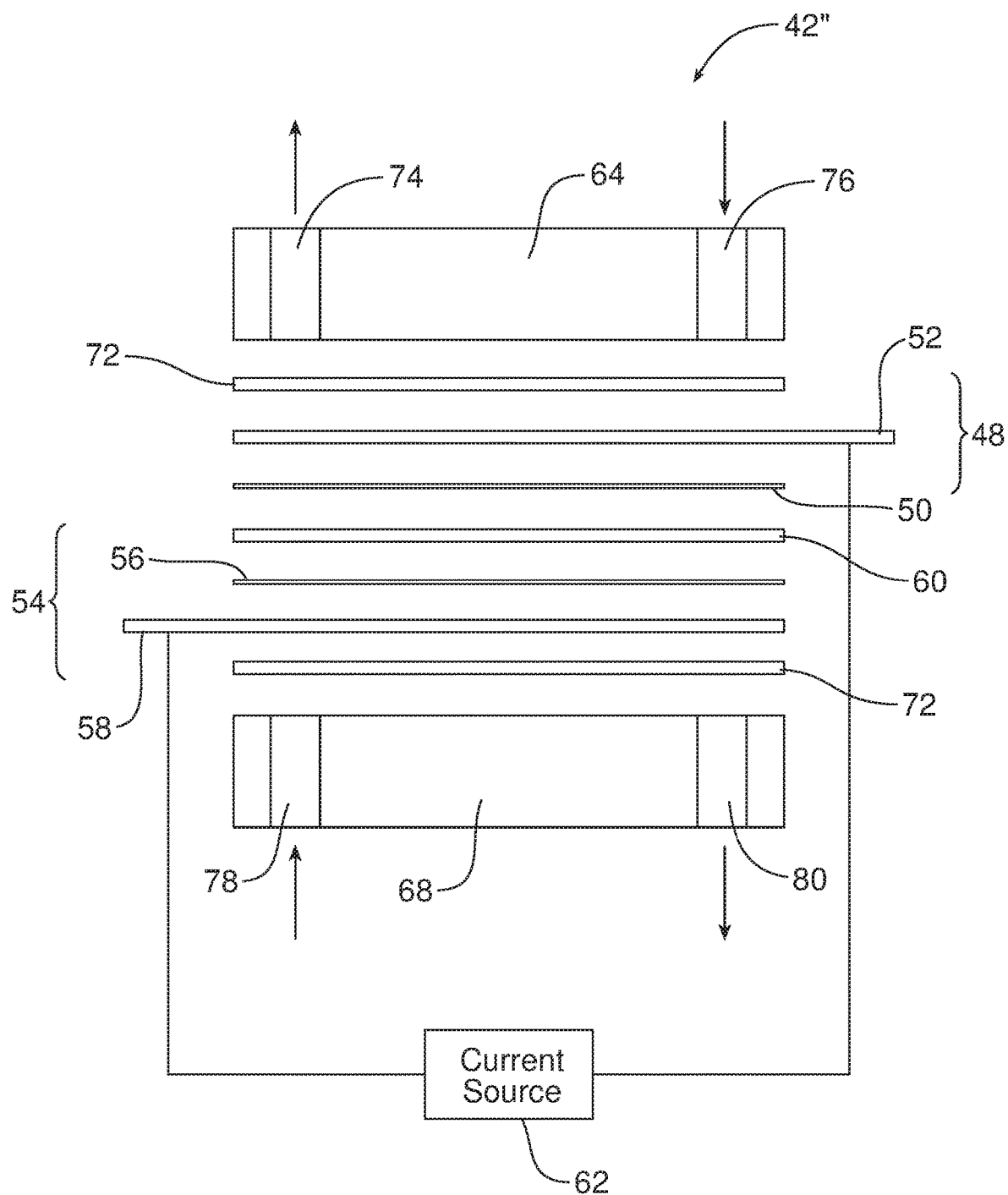
FIG. 4 is a schematic illustration of a third possible embodiment of the electrochemical cell illustrated in FIG. 1.

The electrochemical cell 42 illustrated in FIG. 1 is a flow-through cell that may comprise a number of different embodiments such as those illustrated in FIGS. 2, 3 and 4.

With reference to FIG. 2, the electrochemical cell 42 includes an anode 48 including a first carbon xerogel electrode 50 and a first current collector 52. The electrochemical cell 42 also includes a cathode 54 including a second carbon xerogel electrode 56 and a second current collector 58.

The carbon xerogel electrodes 50, 56 may be made in accordance with the method described in Example 1 below.

The first and second current collectors 52, 58 may be made from titanium or other appropriate electrically conducting material.

The electrochemical cell 42 illustrated in FIG. 2 further includes a separator 60 made from any appropriate insulating material such as felt, porous membranes, ion exchange membranes, cloth-like or woven materials (such as filter paper or nylon woven mesh) or silicone rubber. In addition, the electrochemical cell 42 includes a current source 62 adapted for applying an electrical current across the anode 48 and the cathode 54.

As further illustrated in FIG. 2, the electrochemical cell 42 includes a first end plate 64 including a solution inlet 66 and a second end plate 68 including a solution outlet 70. Action arrow A illustrates the liquid or solution entering the electrochemical cell 42 from the water washing unit 38 while action arrow B illustrates the liquid or solution being returned from the electrochemical cell 42 to the water washing unit following decomposition of nitrosamines. The gaskets 72 between the first end plate 64 and the anode 48 and the second end plate 68 and the cathode 54 seal the electrochemical cell 42 when the illustrated components are compressed together.

Reference is now made to FIG. 3 illustrating an alternative embodiment of the electrochemical cell identified by reference numeral 42'. The electrochemical cell 42' illustrated in FIG. 3 is identical to the electrochemical cell 42 illustrated in FIG. 2 except for the fact that the anode 48 and the cathode 54 are reversed in position so that the solution flowing through the electrochemical cell 42 contacts the cathode 54 before the anode 48 instead of the anode before the cathode as in the FIG. 1 embodiment. In both the electrochemical cell 42 illustrated in FIG. 2 and the electrochemical cell 42' illustrated in FIG. 3, the separator 60 is porous to allow the flow of liquid or solution through the electrochemical cell as illustrated by action arrows A and B.

Yet another alternative embodiment of the electrochemical cell 42" is illustrated in FIG. 4. Like structures are indicated by the same reference numbers: thus, FIG. 4 illustrates an anode 48 including a first carbon xerogel electrode 50 and a first current collector 52, a cathode 54 including a second carbon xerogel electrode 56 and a second current collector 58, a separator 60, a current source 62, a first end plate 64 and a second end plate 68.

The electrochemical cell 42" illustrated in FIG. 4 differs from the electrochemical cells 42 and 42' illustrated in FIGS. 2 and 3 in three primary respects. As shown, the first end plate 64 includes a first solution inlet 74 and a first solution outlet 76 and the second end plate 68 includes a second solution inlet 78 and a second solution outlet 80. In addition, the separator 60 in the embodiment of the electrochemical cell 42" illustrated in FIG. 4 is nonporous and does not allow liquid or solution entering and exiting the anode side of the cell through the first end plate 64 at the first solution inlet 74 and first solution outlet 76 to mix with solution or liquid entering and exiting the cathode side of the cell through the second solution inlet 78 and second solution outlet 80 in the second end plate 68.

Consistent with the above description, a method for capturing $CO_2$ from flue gas and decomposing nitrosamines comprises the steps of removing $CO_2$ from a flue gas by contacting the flue gas with an aqueous amine absorbent in the absorber/absorber tower 12, separating liquid from the flue gas discharged from the absorber at the water washing unit 38, passing at least a portion of the separated liquid through the electrochemical cell 42 and decomposing nitrosamines in the liquid by applying an electrical current across an anode 48 and a cathode 54 of the electrochemical cell.

The method may further include the step of returning the liquid to the absorber/absorber tower 12 (note action arrows 44 and 46) following the decomposing of the nitrosamines. Further, the method may include applying an electrical current of between 5.0 and 100.0 mA/cm$^2$ across the anode 48 and the cathode 54. Further, the method may include continuously applying that electrical current.

Still further, the method may include the step of delivering $CO_2$-rich amine absorbent from the absorber 12 to the stripper 14. Still further, the method may include the step of stripping $CO_2$ from the amine absorbent in the stripper 14. Further, the method may include returning the $CO_2$-lean absorbent from the stripper 14 to the absorber 12.

The following experimental example illustrates how to prepare a carbon xerogel electrode for the electrochemical cell and apparatus described above.

Example 1

Carbon Xerogel Preparation—We first prepared a solution by adding 20.00 g resorcinol ($C_6H_6O_2$, Sigma-Aldrich), 29.48 g formaldehyde ($CH_2O$, 37 wt % in methanol, SigmaAldrich), 6.32 of 0.02 M $Na_2CO_3$ solution (SigmaAldrich), and 6.00 g of deionized $H_2O$ in a sealed glass bottle. The solution was stirred for 30 minutes. The resulting solution was used to infiltrate a dry carbon cloth. Subsequently, the wetted carbon cloth was immobilized between two glass slides, sealed with aluminum foil overnight, and heated at 85° C. for a period of 24 hours in air. A solvent-exchange process was performed for the polymerized sheets in which the sheets were subjected to soaking in deionized water, soaking in acetone, and air-drying. Time taken for each step was 2 hours. Finally, the dried sheets were carbonized using a quartz tube in a computer-controlled furnace at 900° C.

Oxidized Carbon Xerogel—The pristine CX sheets were dipped once into the concentrated $HNO_3$ for 30 minutes and heated at approximate 280° C. in air overnight.

Nitrogen Doped Carbon Xerogel—We first prepared a solution by adding 20.00 g resorcinol ($C_6H_6O_2$, Sigma-Aldrich), 29.48 g formaldehyde ($CH_2O$, 37 wt % in methanol, SigmaAldrich), 6.32 of 0.02 M $Na_2CO_3$ solution (SigmaAldrich), 6.00 g of deionized $H_2O$ and 3 g of Diisopropylcarbodiimide in a sealed glass bottle. The solution was sonicated for 40 minutes. The resulting solution was used to infiltrate a dry carbon cloth. Subsequently, the wetted carbon cloth was immobilized between two glass slides, sealed with aluminum foil overnight, and heated at 85° C. for a period of 24 hours in air. A solvent-exchange process was performed for the polymerized sheets in which the sheets were subjected to soaking in deionized water, soaking in acetone, and air-drying. Time taken for each step was 2 hours. Finally, the dried sheets were carbonized using a quartz tube in a computer-controlled furnace at 700° C.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for capturing $CO_2$ from flue gas, comprising:
   an absorber including a flue gas inlet, a flue gas outlet, a $CO_2$-lean amine absorbent inlet and a $CO_2$-rich amine absorbent outlet;
   a stripper including a $CO_2$-rich amine absorbent inlet, a $CO_2$-lean amine absorbent outlet and a captured $CO_2$ outlet;
   a heat exchanger adapted to receive (a) $CO_2$-lean amine absorbent from said stripper being delivered to said $CO_2$-lean absorbent inlet and (b) $CO_2$-rich amine absorbent from said absorber being delivered to said $CO_2$-rich amine absorbent inlet;
   an amine absorbent circulating through said absorber, said stripper and said heat exchanger;
   a water washing unit downstream from said flue gas outlet; and
   an electrochemical cell connected to said water washing unit and adapted to adsorb and decompose nitrosamine compounds present in liquid separated by said water washing unit.

2. The apparatus of claim 1, wherein said electrochemical cell includes:
   an anode including a first carbon xerogel electrode and a first current collector;
   a cathode including a second carbon xerogel electrode and a second current collector;
   a separator made from an insulating material; and
   a current source applying an electrical current to said anode and said cathode.

3. The apparatus of claim 2, including a first endplate including a solution inlet and a second endplate including a solution outlet.

4. The apparatus of claim 3, wherein said first current collector and said second current collector are made of titanium.

5. The apparatus of claim 4, wherein said anode is adjacent said first endplate, said cathode is adjacent said second endplate and said separator is porous.

6. The apparatus of claim 4, wherein said cathode is adjacent said first endplate, said anode is adjacent said second endplate and said separator is porous.

7. The apparatus of claim 2, including a first endplate having a first solution inlet and a first solution outlet and a second endplate having a second solution inlet and a second solution outlet wherein said first endplate is adjacent said anode, said second endplate is adjacent said cathode and said separator is nonporous.

* * * * *